United States Patent
Khlat et al.

(10) Patent No.: US 8,085,754 B1
(45) Date of Patent: Dec. 27, 2011

(54) SYNCHRONIZING A RADIO FREQUENCY TRANSMIT MESSAGE WITH AN ASYNCHRONOUS RADIO FREQUENCY RECEIVE MESSAGE

(75) Inventors: Nadim Khlat, Cugnaux (FR); David Myara, Toulouse (FR); Jeremie Rafin, Toulouse (FR)

(73) Assignee: RF Micro Devices, Inc., Greensboro, NC (US)

(*) Notice: Subject to any disclaimer, the term of this patent is extended or adjusted under 35 U.S.C. 154(b) by 0 days.

(21) Appl. No.: 13/071,139

(22) Filed: Mar. 24, 2011

Related U.S. Application Data

(63) Continuation of application No. 11/956,379, filed on Dec. 14, 2007, now Pat. No. 7,948,964.

(60) Provisional application No. 60/870,061, filed on Dec. 14, 2006.

(51) Int. Cl.
   *G06F 17/00* (2006.01)
(52) U.S. Cl. ......... 370/350; 370/338; 370/339; 370/349
(58) Field of Classification Search .................. 370/350
   See application file for complete search history.

(56) References Cited

U.S. PATENT DOCUMENTS

| | | | |
|---|---|---|---|
| 6,665,333 B2 | 12/2003 | McCrady et al. | |
| 7,342,538 B2 | 3/2008 | Zimmerman | |
| 7,586,896 B2 * | 9/2009 | Findikli | 370/350 |
| 2002/0136198 A1 * | 9/2002 | Findikli | 370/350 |
| 2004/0090994 A1 | 5/2004 | Lockridge et al. | |
| 2006/0161797 A1 | 7/2006 | Grass et al. | |
| 2007/0133501 A1 | 6/2007 | Park | |
| 2009/0161655 A1 * | 6/2009 | Uppala | 370/350 |

* cited by examiner

*Primary Examiner* — Jeffrey Pwu
*Assistant Examiner* — Sulaiman Nooristany
(74) *Attorney, Agent, or Firm* — Withrow & Terranova, P.L.L.C.

(57) ABSTRACT

The present invention relates to synchronization circuitry that is used to synchronize an asynchronous received RF message with a transmitted RF message. In one embodiment of the present invention, the synchronization circuitry includes at least one counter, which is used to associate timing of the asynchronous received RF message with a receive count value, and associate timing of the transmitted RF message with a transmit count value. A time delay between occurrence of the receive count value and the transmit count value provides accurate timing for the start of the transmitted RF message.

24 Claims, 15 Drawing Sheets

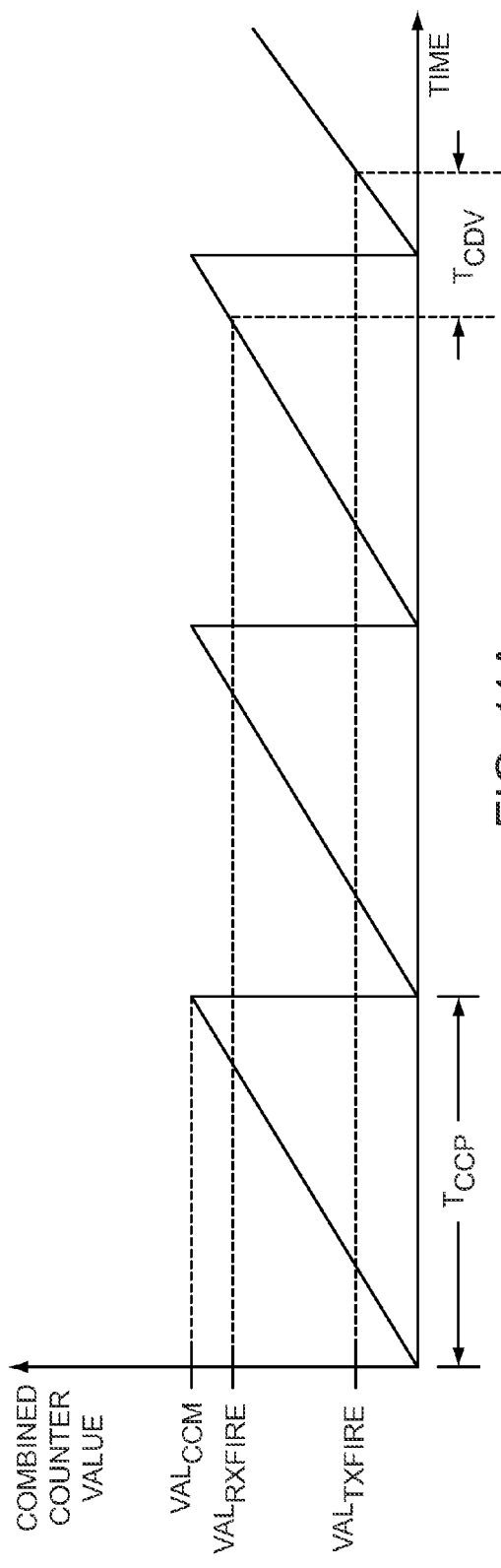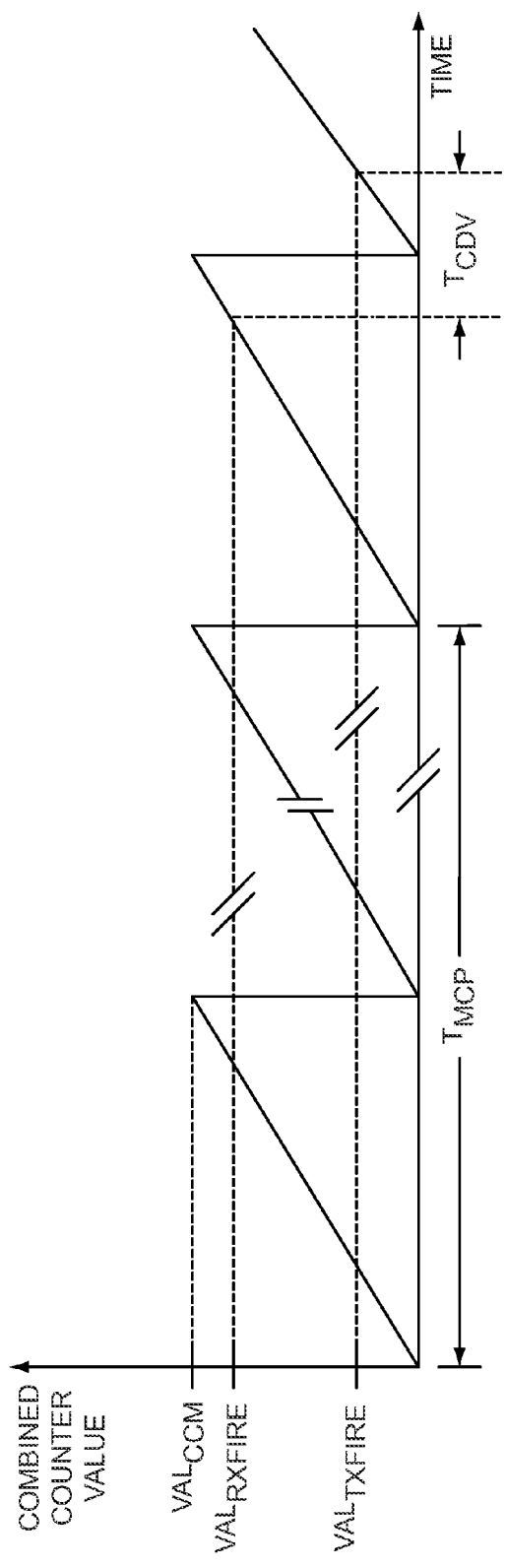

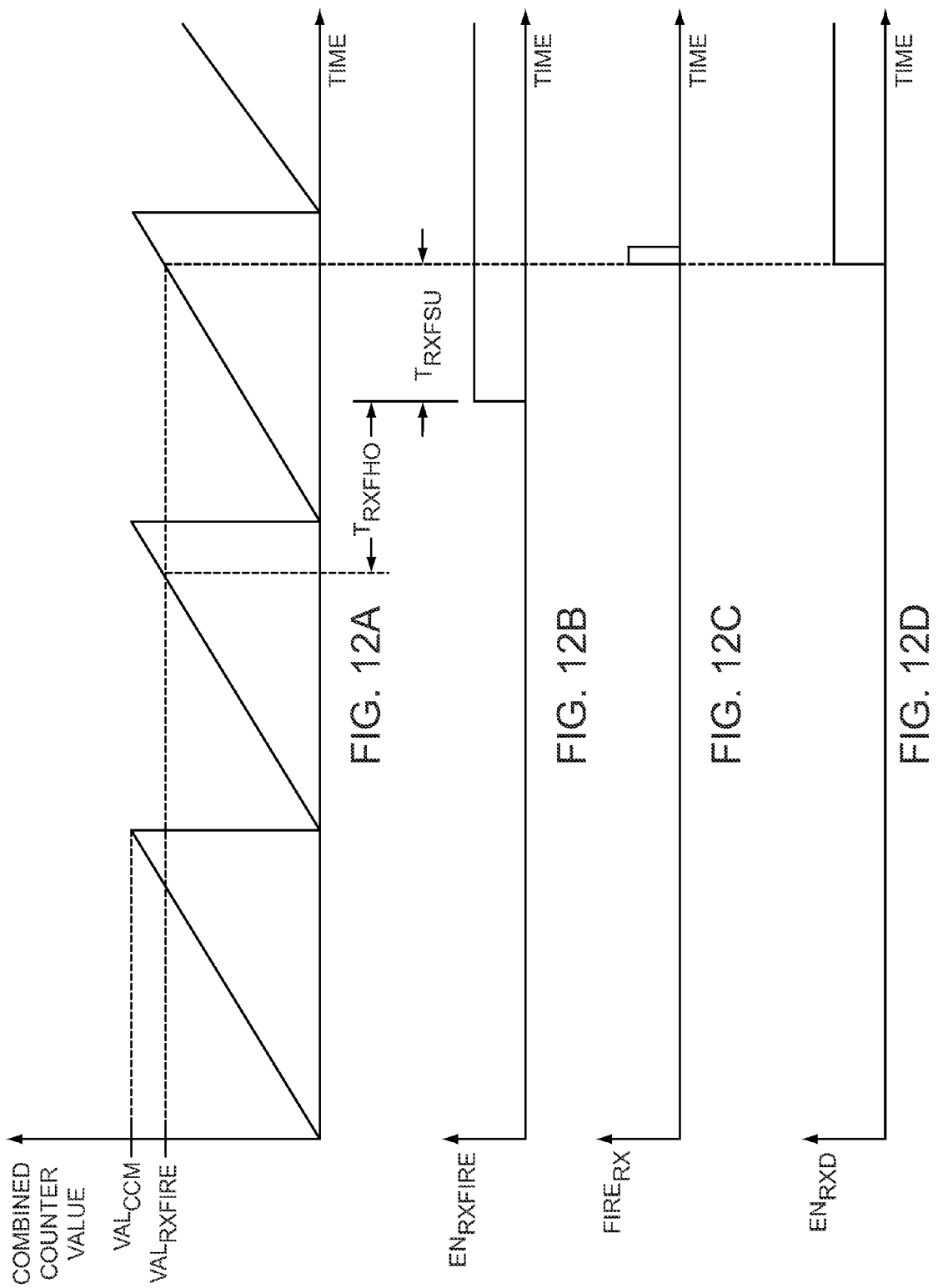

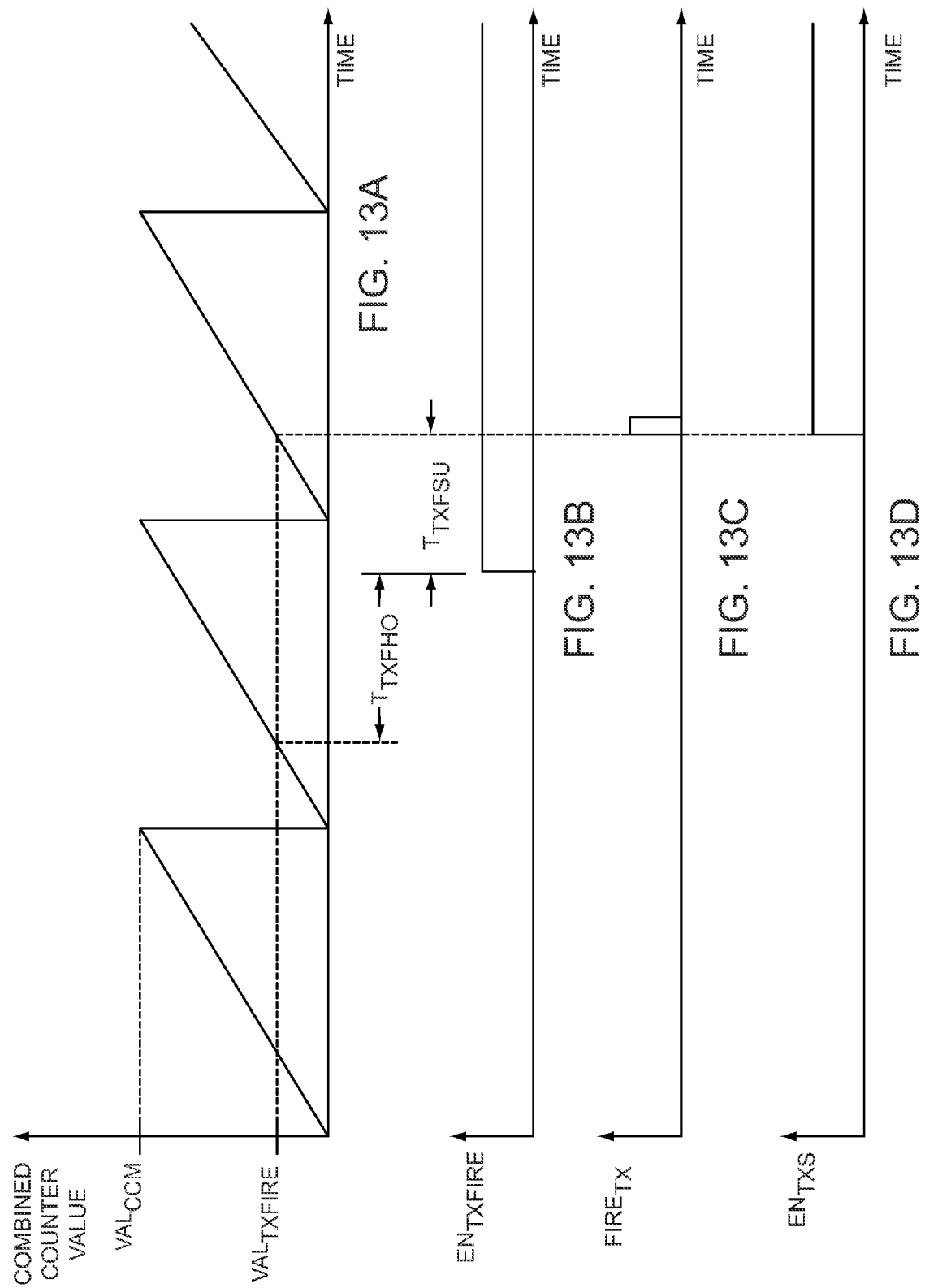

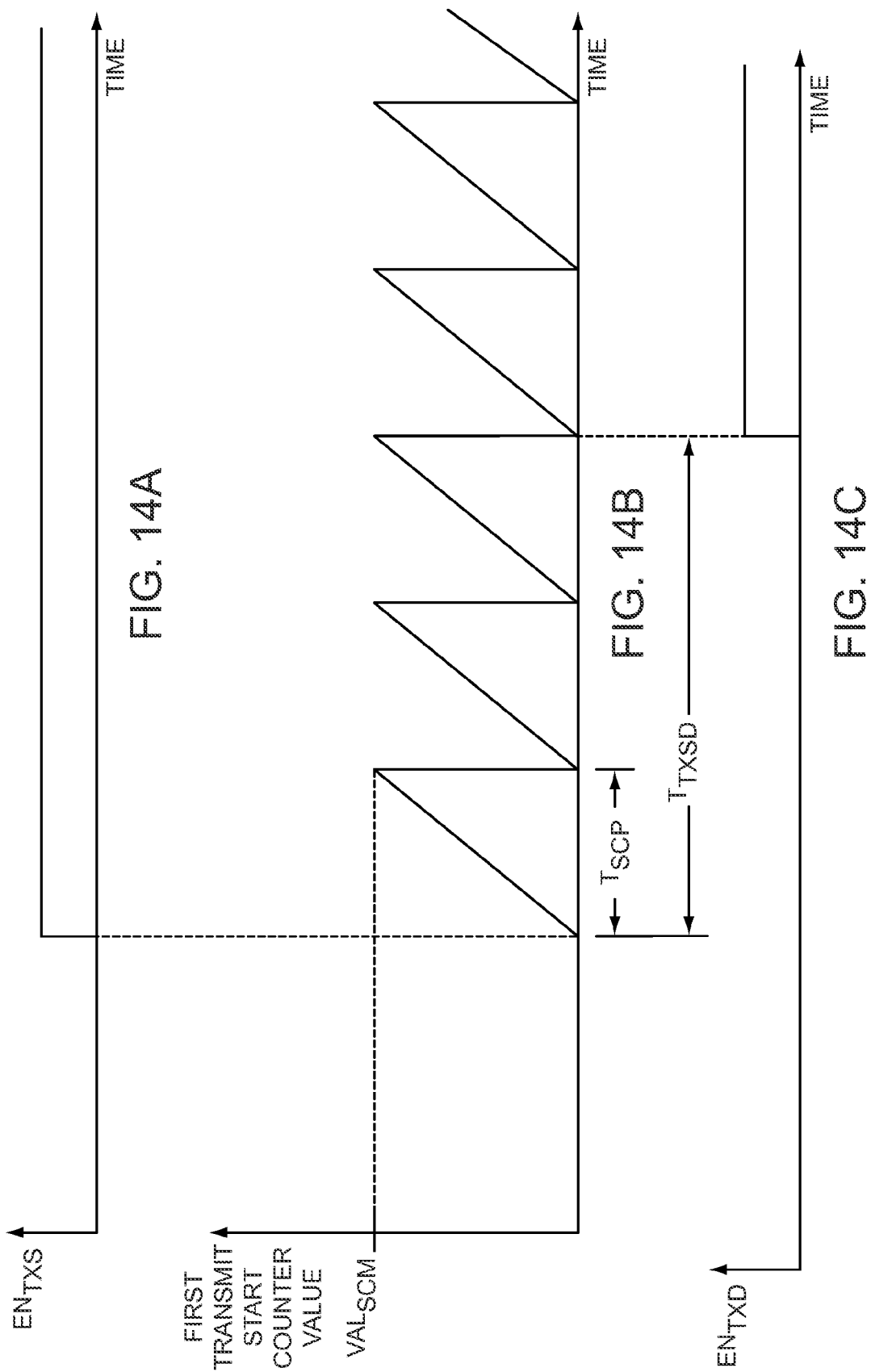

SYNCHRONIZING A RADIO FREQUENCY TRANSMIT MESSAGE WITH AN ASYNCHRONOUS RADIO FREQUENCY RECEIVE MESSAGE

This application is a Continuation of U.S. patent application Ser. No. 11/956,379, filed Dec. 14, 2007, now U.S. Pat. No. 7,948,964, which claims the benefit of provisional patent application Ser. No. 60/870,061 entitled RX-TX WCDMA SYNCHRONIZATION WITH INACCURATE DIGRF3G TAS, filed Dec. 14, 2006, the disclosures of which are hereby incorporated by reference in their entireties.

FIELD OF THE INVENTION

The present invention relates to synchronizing messages between radio frequency (RF) receivers and transmitters, which may be used in RF communications systems.

BACKGROUND OF THE INVENTION

With advances in technology, wireless communications protocols have become more sophisticated and demanding. Specifically, timing requirements related to communications between two wireless devices may be increasingly restrictive. For example, third generation and later cellular communications protocols may have tight restrictions regarding synchronization between a base station and a mobile terminal, such as a cell phone, a personal digital assistant (PDA), or the like.

In a continuous transmit system, such as a Wideband Code Division Multiple Access (WCDMA) system, a mobile terminal may begin a continuous transmission in response to a command from a base station. The start of the continuous transmission may be timed, with tight timing requirements, from the receipt of the command. For example, in a third generation (3G) WCDMA system, the start of the continuous transmission must be timed within +/−1.5 chips relative to a slot boundary of the received command. A chip is a bit in a spreading signal, which is used to encode data bits in a direct sequence spread spectrum system, such as a WCDMA system. Later generation systems may have tighter timing requirements than third generation systems.

Timing errors may be introduced at the start of the continuous transmission due to variable or uncompensated latencies in the mobile terminal. For example, the mobile terminal may include a baseband integrated circuit (IC) and an RF IC that communicate with each other using a baseband communications link. A start transmission command may be received and down-converted by the RF IC, sent to the baseband IC over the baseband communications link, and processed by the baseband IC to create a transmit start command, which is sent to the RF IC over the baseband communications link. The RF IC decodes and executes the transmit start command to begin continuous transmission. However, uncompensated latencies or variances in latencies introduced by the baseband IC, the RF IC, or the baseband communications link may introduce transmit timing errors that cannot be corrected. Thus, there is a need to reduce timing errors at the start of a transmission due to variable or uncompensated latencies in a mobile terminal.

SUMMARY OF THE EMBODIMENTS

The present invention relates to synchronization circuitry that is used to synchronize an asynchronous received RF message with a transmitted RF message. In one embodiment of the present invention, the synchronization circuitry includes at least one counter, which is used to associate timing of the asynchronous received RF message with a receive count value and associate timing of the transmitted RF message with a transmit count value. A time delay between occurrence of the receive count value and the transmit count value provides accurate timing for the start of the transmitted RF message.

In one embodiment of the present invention, the synchronization circuitry may be part of an RF integrated circuit (IC) that may communicate with a baseband IC using a baseband communications link. The receive count value, the transmit count value, or both, may be determined by the baseband IC and sent to the synchronization circuitry over the baseband communications link. The receive and transmit count values may be associated with a single counter, with two separate counters, or with other circuitry.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 7A, 7B, 7C, and 7D are graphs illustrating timing relationships between a received RF message and different receive signals, according to one embodiment of the present invention.

FIGS. 8A, 8B, 8C, and 8D are graphs illustrating timing relationships between a transmitted RF message and different transmit signals, according to one embodiment of the present invention.

Figure 9:
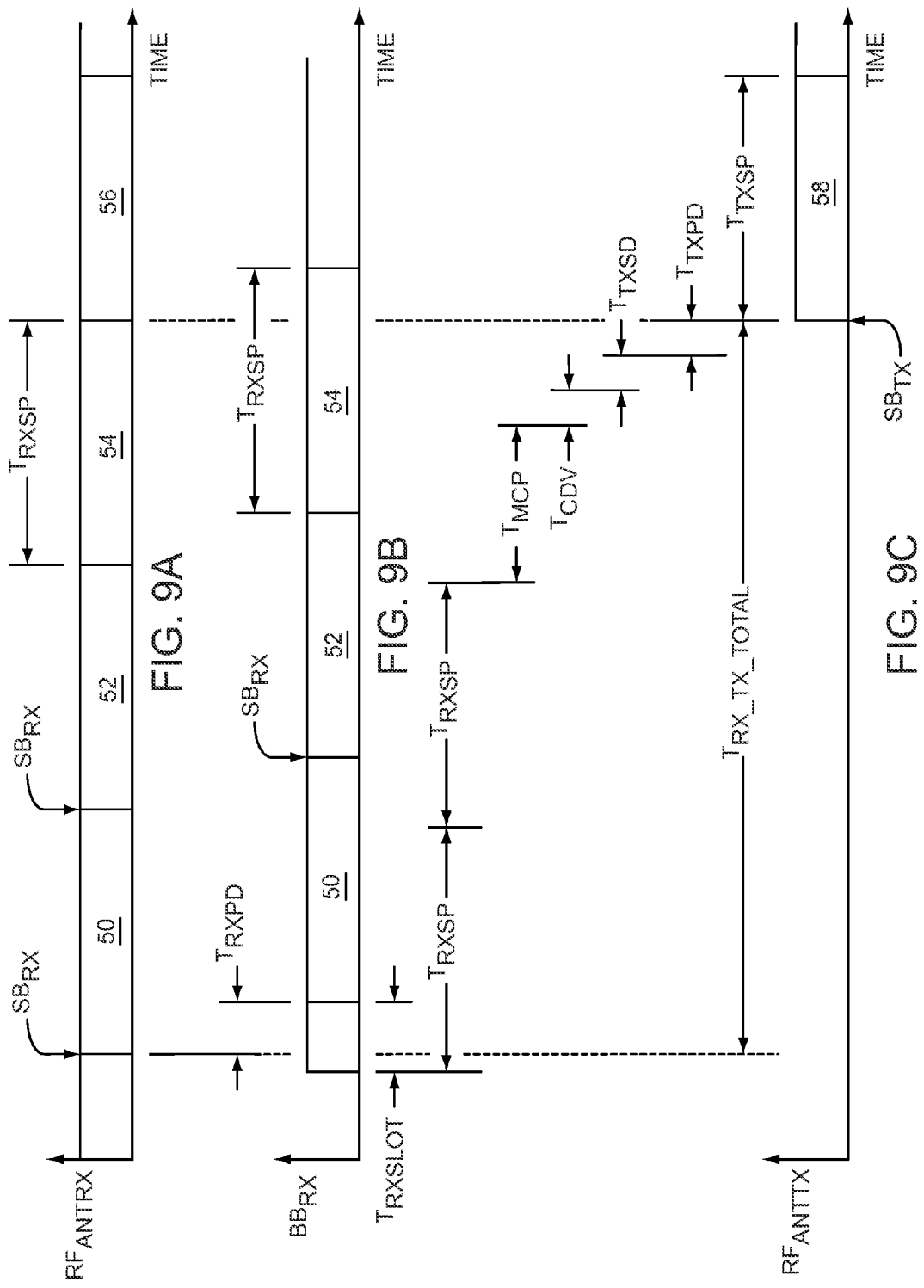

FIGS. 9A, 9B, and 9C are graphs illustrating a detailed timing budget between a received RF message and a transmitted RF message, according to one embodiment of the present invention.

Figure 3:
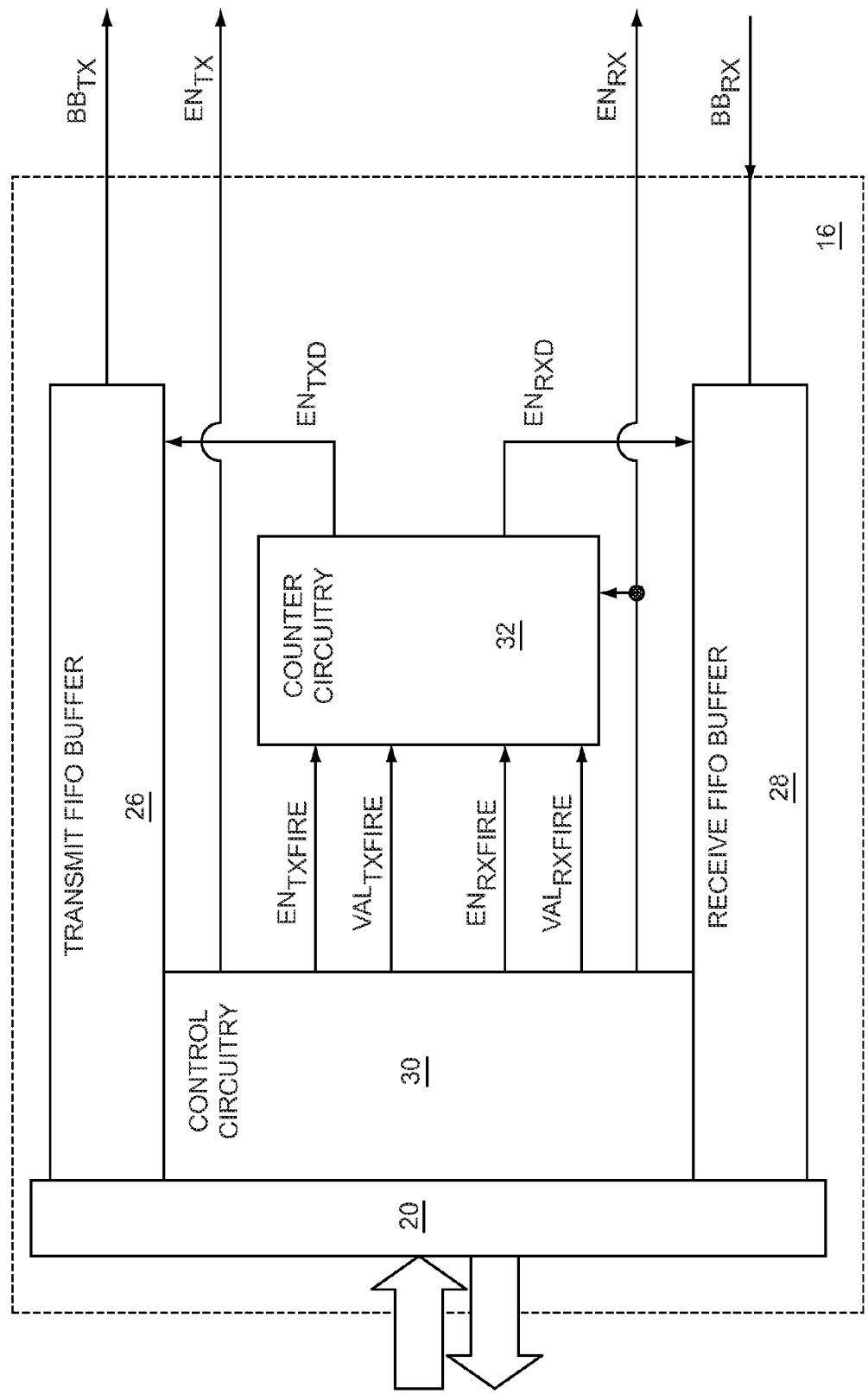
FIG. 3 shows details of the synchronization circuitry illustrated in FIG. 1.
Figure 10:
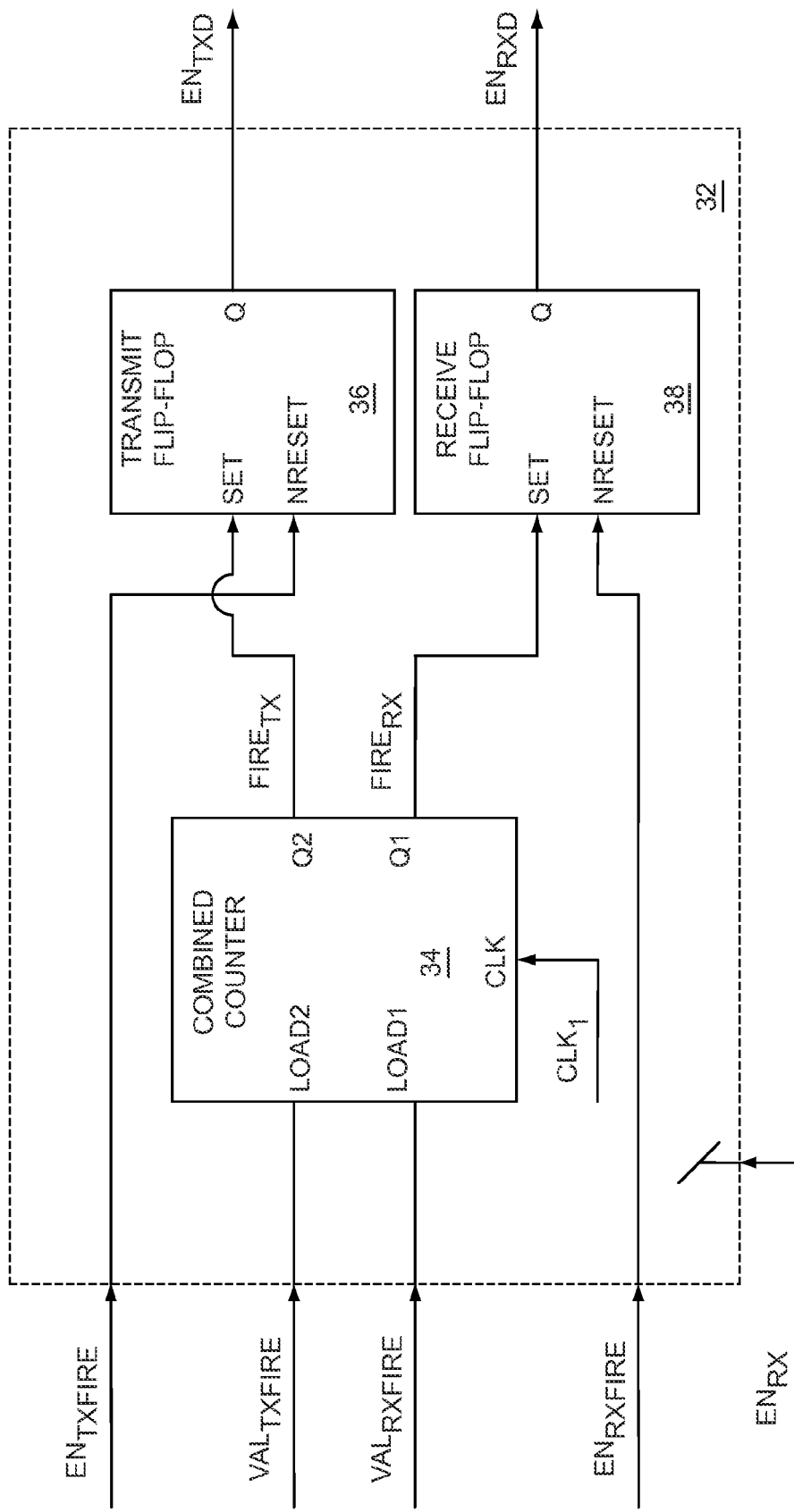

FIG. 10 shows details of the counter circuitry illustrated in FIG. 3, according to an additional embodiment of the present invention.

Figure 4:
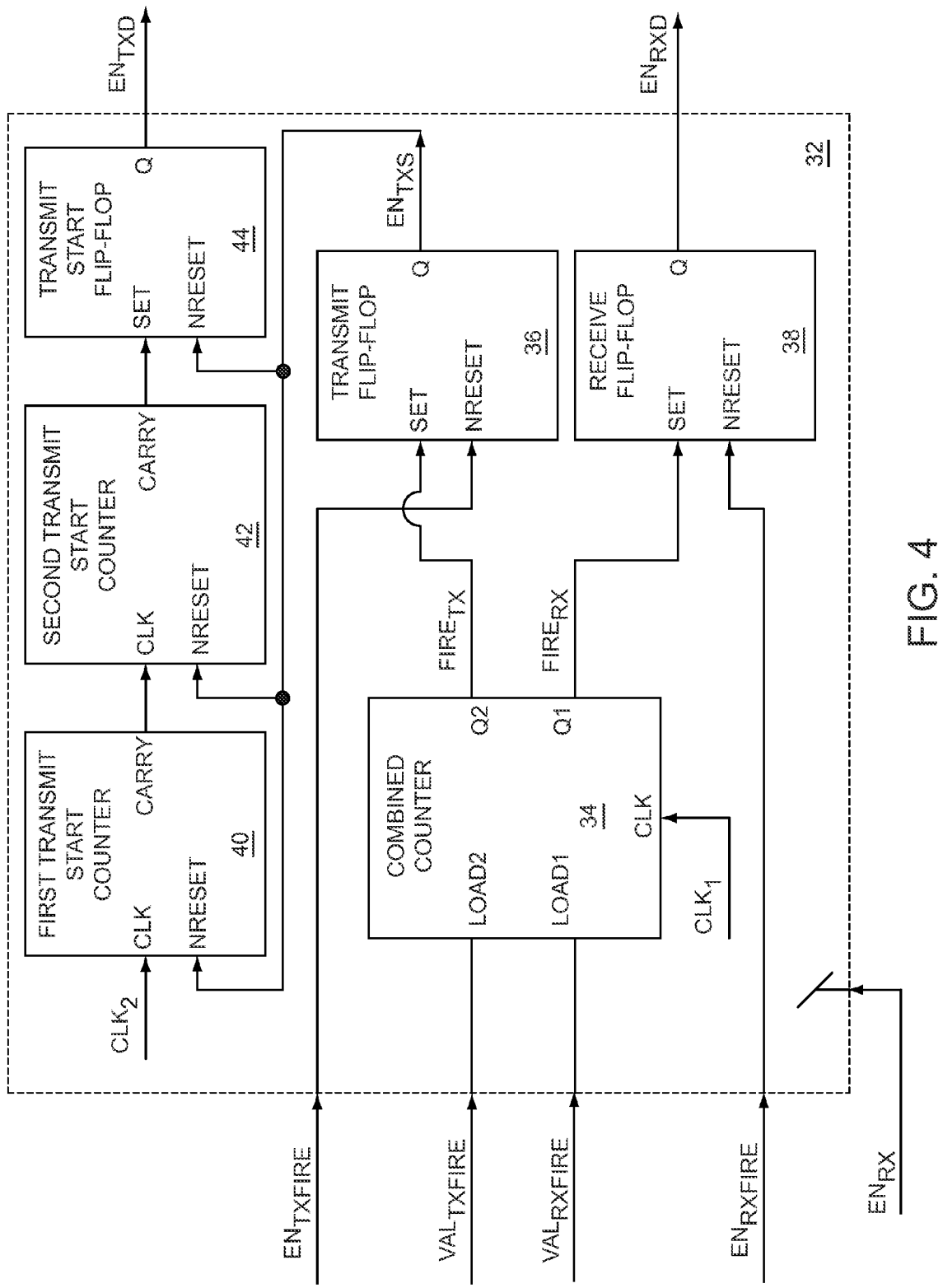
FIG. 4 shows details of the counter circuitry illustrated in FIG. 3, according to one embodiment of the present invention.

FIGS. 11A and 11B are graphs showing behaviors of the combined counter illustrated in FIG. 4.

FIGS. 12A, 12B, 12C, and 12D are graphs illustrating timing relationships between the behavior of the combined counter and different receive signals, according to one embodiment of the present invention.

FIGS. 13A, 13B, 13C, and 13D are graphs illustrating timing relationships between the behavior of the combined counter and different transmit signals, according to one embodiment of the present invention.

FIGS. 14A, 14B, and 14C are graphs illustrating timing relationships between the behavior of the first transmit start counter and different transmit signals, according to one embodiment of the present invention.

Figure 15:
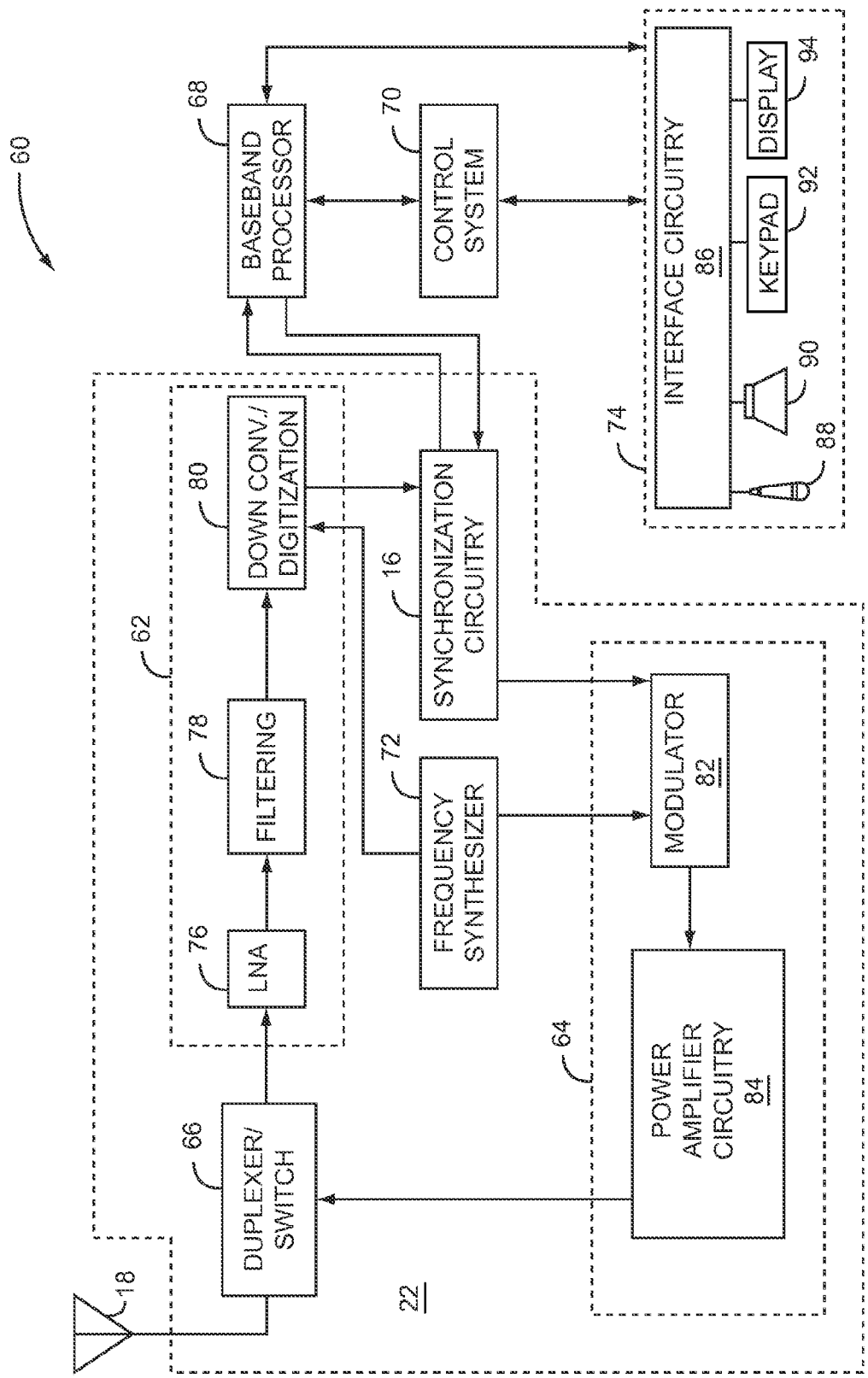

FIG. 15 shows an application example of the present invention used in a mobile terminal.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Embodiments of the present invention relate to synchronization circuitry that is used to synchronize an asynchronous received RF message with a transmitted RF message. In one embodiment of the present invention, the synchronization circuitry includes at least one counter, which is used to associate timing of the asynchronous received RF message with a receive count value and associate timing of the transmitted RF message with a transmit count value. A time delay between occurrence of the receive count value and the transmit count value provides accurate timing for the start of the transmitted RF message.

In one embodiment of the present invention, the synchronization circuitry may be part of an RF integrated circuit (IC) that may communicate with a baseband IC using a baseband communications link. The receive count value, the transmit count value, or both, may be determined by the baseband IC and sent to the synchronization circuitry over the baseband communications link. The receive and transmit count values may be associated with a single counter, with two separate counters, or with other circuitry.

A synchronous RF signal has an embedded clock signal, which is used to encode or decode data in the RF signal. An asynchronous RF signal does not have an embedded clock signal; therefore, timing related information is contained in data in the RF signal. An asynchronous received RF message may include timing related data that is part of the received message. Timing information must be extracted from the timing related data, and may take the form of a timing packet, such as a time accurate strobe (TAS). Likewise, an asynchronous transmitted RF message may include timing related data that is part of the transmitted message. The present invention may include an asynchronous transmitted RF message, a synchronous transmitted RF message, or both.

Figure 1:
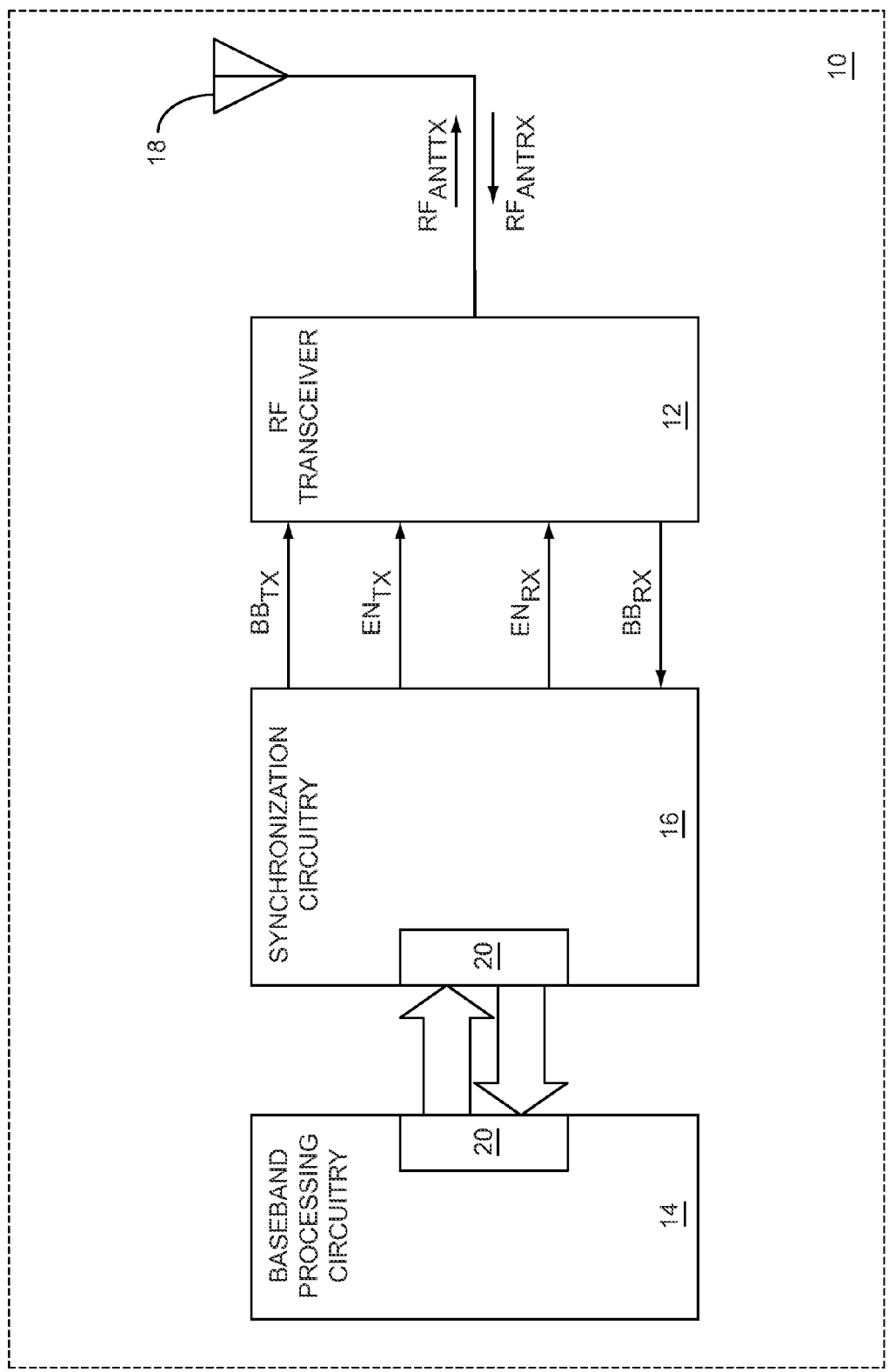
FIG. 1 shows an RF communications system according to one embodiment of the present invention.

FIG. 1 shows an RF communications system 10 according to one embodiment of the present invention. The RF communications system 10 includes an RF transceiver 12 having an RF transmitter and an RF receiver for transmitting and receiving RF messages, baseband processing circuitry 14 for processing baseband messages received from and sent to the RF transceiver 12, and synchronization circuitry 16 coupled between the RF transceiver 12 and the baseband processing circuitry 14, and used to synchronize an asynchronous received RF message with a transmitted RF message. The RF transceiver 12 is coupled to an antenna 18 that is used to send and receive RF signals, which contain the received and transmitted RF messages. In one embodiment of the present invention, the transmitted RF message as it appears in an RF transmit antenna signal $RF_{ANTTX}$ at the antenna 18, is synchronized with the asynchronous received RF message as it appears in an RF receive antenna signal $RF_{ANTRX}$ at the antenna 18.

The baseband processing circuitry 14 and the synchronization circuitry 16 may each include a baseband communications interface 20 to communicate with each other. The baseband communications interface 20 may be synchronous, asynchronous, or both, and may send packets back and forth. The synchronization circuitry 16 may provide a transmit enable signal $EN_{TX}$, a receive enable signal $EN_{RX}$, or both, to the RF transceiver 12 to selectively enable the RF transmitter, the RF receiver, or both. The transmit and receive enable signals $EN_{TX}$, $EN_{RX}$ may be based on baseband messages received from the baseband processing circuitry 14.

The RF transceiver 12 down converts an asynchronous received RF message into a received baseband message, which is sent to the synchronization circuitry 16 using a receive baseband signal $BB_{RX}$. The received baseband message is then forwarded to the baseband processing circuitry 14 for further processing. The baseband processing circuitry 14 forms a transmit baseband message, which is forwarded to the synchronization circuitry 16 for transmission. The RF transceiver 12 receives the transmit baseband message from the synchronization circuitry 16 using a transmit baseband signal $BB_{TX}$. The transmitted RF message is formed by modulating an RF carrier signal using the transmit baseband message.

In one embodiment of the present invention, the synchronization circuitry 16 synchronizes the transmit baseband message with the received baseband message, which effectively synchronizes the asynchronous received RF message, from which the received baseband message was extracted, with the transmitted RF message formed from the transmit baseband message. Uncharacterized latencies, latency variations, or both, in the baseband communications interface 20 may introduce RF receive to RF transmit synchronization errors that exceed allowable limits. By synchronizing the transmit baseband message with the received baseband message using the synchronization circuitry 16, the baseband communications interface 20 is bypassed for synchronization. Therefore, the effects of uncharacterized latencies and latency variations are reduced.

Figure 2:
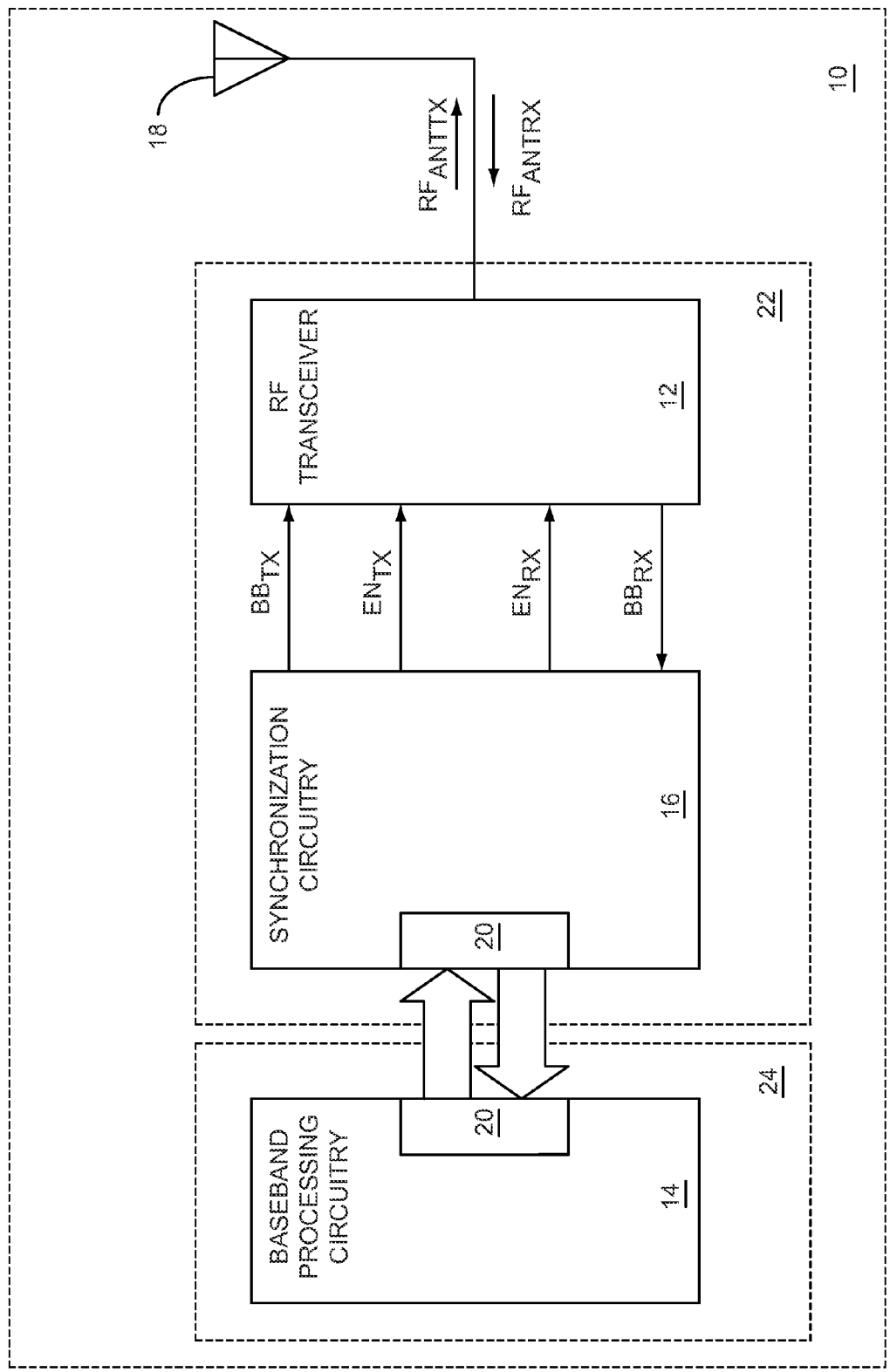
FIG. 2 shows the RF transceiver and the synchronization circuitry illustrated in FIG. 1 as part of an RF integrated circuit.

FIG. 2 shows the RF transceiver 12 and the synchronization circuitry 16 illustrated in FIG. 1 as part of an RF integrated circuit 22, according to one embodiment of the present invention. Additionally, the baseband processing circuitry 14 may form part of a baseband integrated circuit 24. Each of the RF and baseband integrated circuits 22, 24 may include the baseband communications interface 20 to communicate with each other. The RF and baseband integrated circuits 22, 24 may be used to form a communications module (not shown).

FIG. 3 shows details of the synchronization circuitry 16 illustrated in FIG. 1. A transmit first-in first-out (FIFO) buffer 26 receives transmit baseband messages from the baseband communications interface 20 for forwarding to the RF transceiver 12 using the transmit baseband signal $BB_{TX}$. The transmit baseband messages are forwarded in the order in which they are received. A receive FIFO buffer 28 receives received baseband messages from the RF transceiver 12 using the receive baseband signal $BB_{RX}$. The received baseband messages are forwarded to the baseband processing circuitry 14 using the baseband communications interface 20.

Control circuitry 30 sends and receives control messages to and from the baseband processing circuitry 14 using the baseband communications interface 20. The control circuitry 30 provides the transmit enable signal $EN_{TX}$ and the receive enable signal $EN_{RX}$ to the RF transceiver 12. Additionally, the control circuitry 30 provides a receive count value $VAL_{RXFIRE}$, a transmit count value $VAL_{TXFIRE}$, a transmit fire enable signal $EN_{TXFIRE}$, and a receive fire enable signal $EN_{RXFIRE}$, to counter circuitry 32, which provides a transmit data enable signal $EN_{TXD}$ to the transmit FIFO buffer 26 and a receive data enable signal $EN_{RXD}$ to the receive FIFO buffer 28.

A receive counter in the counter circuitry 32 continuously increments. When the receive fire enable signal $EN_{RXFIRE}$ is in an enabled state and the receive counter reaches the receive count value $VAL_{RXFIRE}$, the receive data enable signal $EN_{RXD}$ is driven from a disabled state to an enabled state, which causes the receive FIFO buffer 28 to start receiving data from the RF transceiver 12. A transmit counter in the counter circuitry 32 continuously increments. When the transmit fire enable signal $EN_{TXFIRE}$ is in an enabled state and the transmit counter reaches the transmit count value $VAL_{TXFIRE}$, the transmit data enable signal $EN_{TXD}$ is driven from a disabled state to an enabled state, which causes the transmit FIFO buffer 26 to start transmitting data to the RF transceiver 12. Therefore, the start of a data transmission is controlled and synchronized to the receipt of data reception by controlling the transmit count value $VAL_{TXFIRE}$ and the timing of the transmit data enable signal $EN_{TXD}$ relative to the receive count value $VAL_{RXFIRE}$ and the timing of the receive data enable signal $EN_{RXD}$.

In one embodiment of the present invention, the receive counter and the transmit counter are provided by two separate counters, which are either clocked from a common clock signal or are clocked from two different clock signals that are synchronized with each other. In an alternate embodiment of the present invention, the receive counter and the transmit counter are provided by a single combined counter. The counter circuitry 32 may use the receive enable signal $EN_{RX}$, the transmit enable signal $EN_{TX}$, or both, to selectively enable, synchronize, or both, individual circuits within the counter circuitry 32.

FIG. 4 shows details of the counter circuitry 32 illustrated in FIG. 3, according to one embodiment of the present invention. A clock input CLK of a combined counter 34 receives a first clock signal $CLK_1$, which continuously increments the combined counter 34. The receive count value $VAL_{RXFIRE}$ and the transmit count value $VAL_{TXFIRE}$ are provided to a first load input LOAD1 and a second load input LOAD2, respectively, of the combined counter 34. A reset input N RESET of a transmit flip-flop 36 receives the transmit fire enable signal $EN_{TXFIRE}$, and a data output Q of the transmit flip-flop 36 provides a transmit start enable signal $EN_{TXS}$. Likewise, a reset input N RESET of a receive flip-flop 38 receives the receive fire enable signal $EN_{RXFIRE}$, and a data output Q of the receive flip-flop 38 provides the receive data enable signal $EN_{RXD}$.

A first data output Q1 of the combined counter 34 provides a receive fire signal $FIRE_{RX}$ to a set input SET of the receive flip-flop 38, and a second data output Q2 of the combined counter 34 provides a transmit fire signal $FIRE_{TX}$ to a set input SET of the transmit flip-flop 36. When the receive fire enable signal $EN_{RXFIRE}$ is in a disabled state, the receive flip-flop 38 is held in a reset state. Then, after the receive fire enable signal $EN_{RXFIRE}$ transitions from the disabled state to an enabled state and the combined counter 34 reaches the receive count value $VAL_{RXFIRE}$, the first data output Q1 transitions to an active state, which sets the receive flip-flop 38, thereby driving the receive data enable signal $EN_{RXD}$ from a disabled state to an enabled state, which causes the receive FIFO buffer 28 to start receiving data from the RF transceiver 12.

When the transmit fire enable signal $EN_{TXFIRE}$ is in a disabled state, the transmit flip-flop 36 is held in a reset state. Then, after the transmit fire enable signal $EN_{TXFIRE}$ transitions from the disabled state to an enabled state and the combined counter 34 reaches the transmit count value $VAL_{DXFIRE}$, the second data output Q2 transitions to an active state, which sets the transmit flip-flop 36, thereby driving the transmit start enable signal $EN_{TXS}$ from a disabled state to an enabled state.

Reset inputs NRESET of a first transmit start counter 40, a second transmit start counter 42, and a transmit start flip-flop 44 receive the transmit start enable signal $EN_{TXS}$. A clock input CLK to the first transmit start counter 40 receives a second clock signal $CLK_2$, which may be synchronized with or provided by the first clock signal $CLK_1$. A carry output CARRY from the first transmit start counter 40 feeds a clock input CLK to the second transmit start counter 42. A carry output CARRY from the second transmit start counter 42 feeds a set input SET to the transmit start flip-flop 44. A data output Q from the transmit start flip-flop 44 provides the transmit data enable signal $EN_{TXD}$.

When the transmit start enable signal $EN_{TXS}$ is in a disabled state, the first transmit start counter 40, the second transmit start counter 42, and the transmit start flip-flop 44 are all held in reset states. When the transmit start enable signal $EN_{TXS}$ transitions from the disabled state to an enabled state, the first transmit start counter 40 begins incrementing. When the first transmit start counter 40 rolls over and drives a carry signal from its carry output CARRY to an active state, the second transmit start counter 42 increments and will continue to increment for each roll over of the first transmit start counter 40. Therefore, the second transmit start counter 42 counts periods of the first transmit start counter 40. When the second transmit start counter 42 rolls over and drives a carry signal from its carry output CARRY to an active state, the transmit start flip-flop 44 is set, which drives the transmit data enable signal $EN_{TXD}$ from a disabled state to an enabled state, thereby causing the transmit FIFO buffer 26 to start sending transmit data to the RF transceiver 12 for transmission.

In an exemplary embodiment of the present invention, the combined counter 34, the first transmit start counter 40, or both, may be modulo 65 counters, in which a count value increments from zero through 64 before rolling over to zero. A frequency of the first clock signal $CLK_1$ may be about 15.6 megahertz. A frequency of the second clock signal $CLK_2$ may be about 15.6 megahertz or about 31.2 megahertz. The second transmit start counter 42 may roll over and drive a carry signal from its carry output CARRY to an active state after three periods of the first transmit start counter 40. In alternate embodiments of the present invention, roll over values of the combined counter 34, the first transmit start counter 40, and the second transmit start counter 42, may be any number or combination of different numbers. The first and second clock signals $CLK_1$, $CLK_2$ may be any frequency and may be different from each other.

Figure 5:
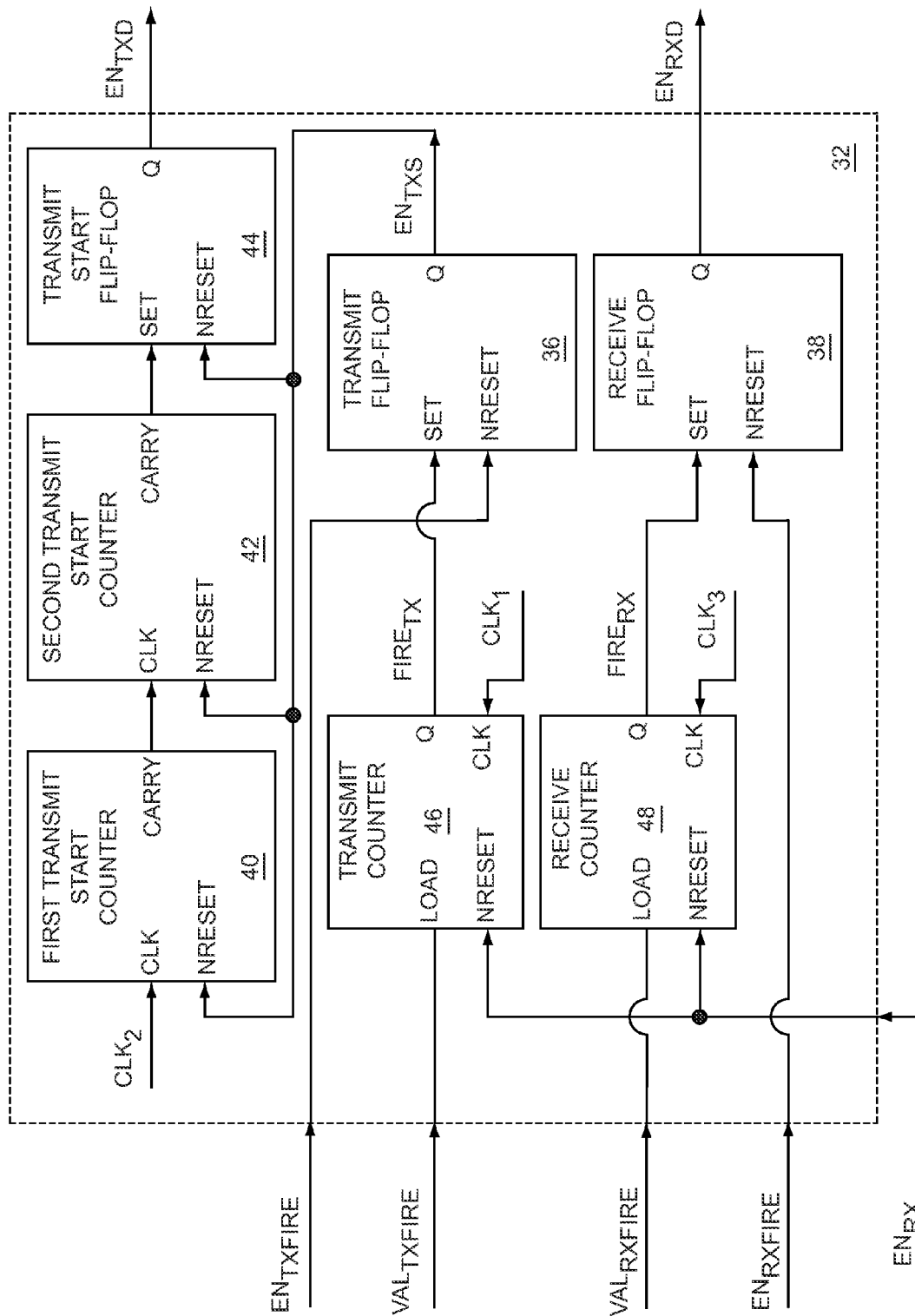
FIG. 5 shows details of the counter circuitry illustrated in FIG. 3, according to an alternate embodiment of the present invention.

FIG. 5 shows details of the counter circuitry 32 illustrated in FIG. 3, according to an alternate embodiment of the present invention. The combined counter 34 illustrated in FIG. 4 is replaced by a transmit counter 46 and a receive counter 48. Each of the transmit and receive counters 46, 48 has a reset input NRESET, which is driven by the receive enable signal $EN_{RX}$. Therefore, when the receive enable signal $EN_{RX}$ is in a disabled state, the transmit and receive counters 46, 48 are held in reset. When the receive enable signal $EN_{RX}$ transitions to an enabled state, the transmit and receive counters 46, 48 synchronously start incrementing. A clock input CLK to the transmit counter 46 receives the first clock signal $CLK_1$, and a clock input CLK to the receive counter 48 receives a third clock signal $CLK_3$, which may be synchronized with or provided by the first clock signal $CLK_1$. The receive count value $VAL_{RXFIRE}$ is provided to a load input LOAD of the receive counter 48, which provides the receive fire signal $FIRE_{RX}$ from a data output Q. The transmit count value $VAL_{TXFIRE}$ is provided to a load input LOAD of the transmit counter 48, which provides the transmit fire signal $FIRE_{TX}$ from a data output Q. The third clock signal $CLK_3$ may be any frequency.

Figure 6:
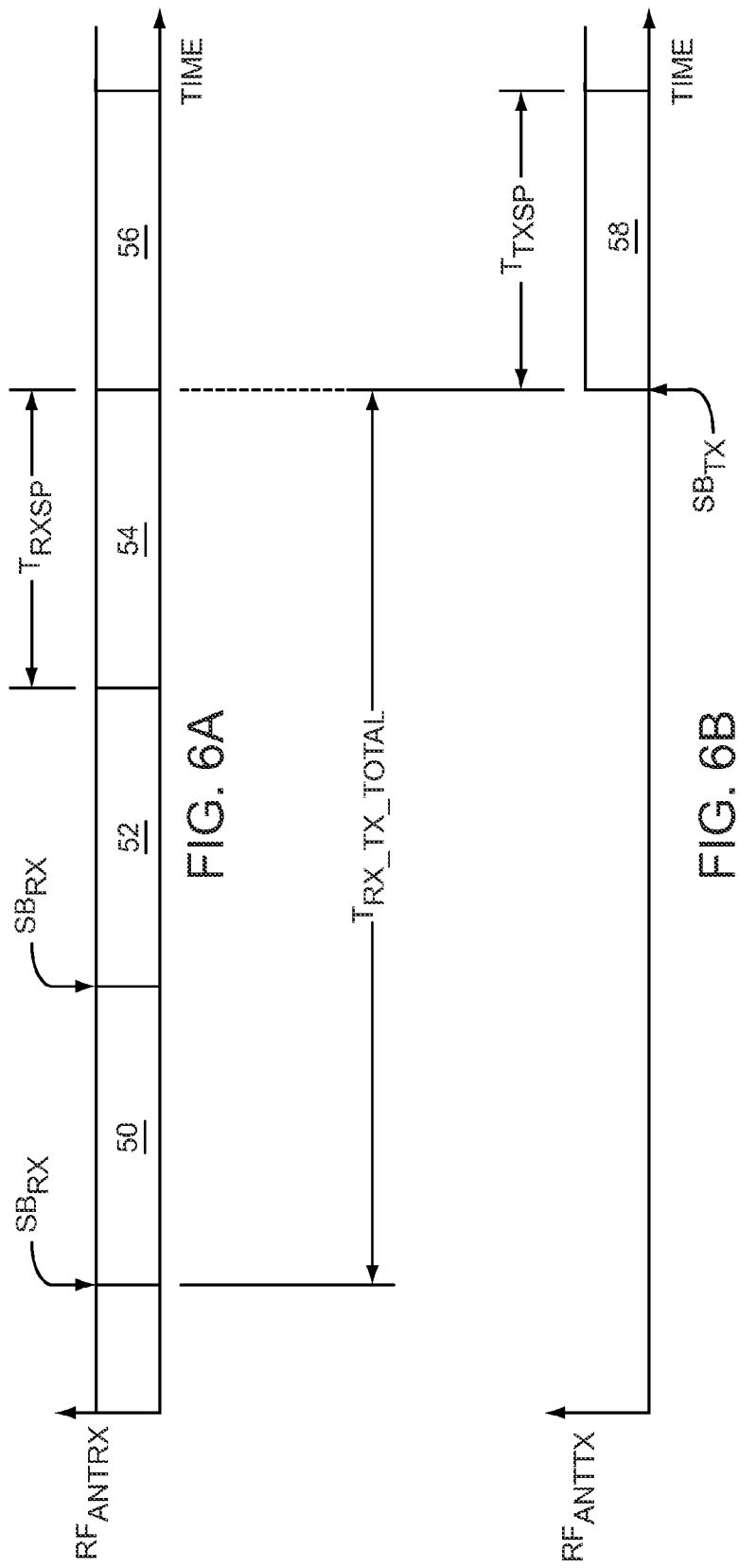
FIGS. 6A and 6B are graphs illustrating the timing relationship between a received RF message and a transmitted RF message, according to one embodiment of the present invention.

FIGS. 6A and 6B are graphs illustrating the timing relationship between a received RF message and a transmitted RF message, according to one embodiment of the present invention. FIG. 6A shows a received RF message in an RF receive antenna signal $RF_{ANTRX}$. The received RF message includes a first receive slot 50, a second receive slot 52, a third receive slot 54, and a fourth receive slot 56, which are separated by receive slot boundaries $SB_{RX}$. A receive slot 50, 52, 54, 56 has a receive slot duration $T_{RXSP}$. FIG. 6B shows a transmitted RF message in an RF transmit antenna signal $RF_{ANTTX}$. The transmitted RF message includes a first transmit slot 58, which has a transmit slot boundary $SB_{TX}$ at the beginning of the transmitted RF message, and transmit slot boundaries $SB_{TX}$ separating any subsequent transmit slots. The first transmit slot 58 has a transmit slot duration $T_{TXSP}$.

A receive to transmit delay $T_{RX\_TX\_TOTAL}$ is the time from a receive slot boundary $SB_{RX}$ in the received RF message at the antenna 18 to the transmit slot boundary $SB_{TX}$ at the beginning of the transmitted RF message at the antenna 18. In one embodiment of the present invention, a system requirement may specify the receive to transmit delay $T_{RX\_TX\_TOTAL}$ to be a whole number multiple of the receive slot duration $T_{RXSP}$. A timing tolerance requirement of the receive to transmit delay $T_{RX\_TX\_TOTAL}$ may allow no more error than plus or minus 1.5 chip durations. Receive time accurate strobe (TAS) messages from the synchronization circuitry 16 to the baseband processing circuitry 14 may introduce timing latency variation on the order of about two chip durations. Likewise, transmit TAS messages from the baseband processing circuitry 14 to the synchronization circuitry 16 may introduce timing latency variation on the order of about two chip durations. Therefore, the synchronization circuitry 16 may be needed to meet system requirements. In alternate embodiments of the present invention, the received RF message may include any number of receive slots of any duration and the transmitted RF message may include any number of transmit slots of any duration. In additional embodiments of the present invention, the receive to transmit delay $T_{RX\_TX\_TOTAL}$ may be adjusted as needed to compensate for internal timing variations or as commanded by a received RF message.

Figure 7:
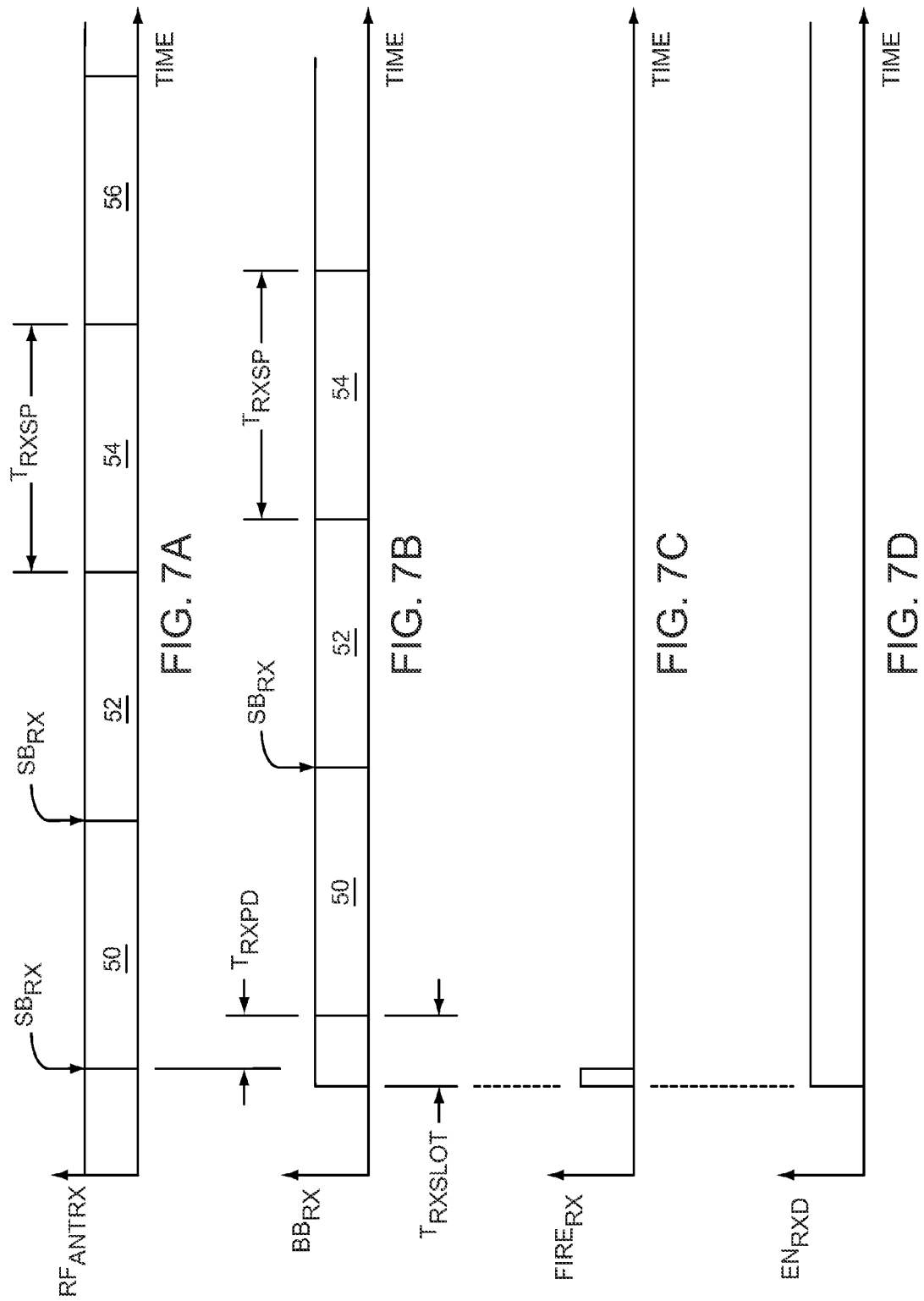

FIGS. 7A, 7B, 7C, and 7D are graphs illustrating timing relationships between a received RF message and different receive signals, according to one embodiment of the present invention. FIG. 7A is similar to FIG. 6A and shows a received RF message in an RF receive antenna signal $RF_{ANTRX}$. FIG. 7B shows a received baseband message, which mirrors the received RF message, in the receive baseband signal $BB_{RX}$ as it is received into the receive FIFO buffer 28 when the receive data enable signal $EN_{RXD}$ is driven from a disabled state to an enabled state. FIG. 7C shows the receive fire signal $FIRE_{RX}$ and FIG. 7D shows the receive data enable signal $EN_{RXD}$. When the combined counter 34 reaches the receive count value $VAL_{RXFIRE}$ and the receive fire signal $FIRE_{RX}$ transitions to an active state, the receive flip-flop 38 is set, thereby driving the receive data enable signal $EN_{RXD}$ from a disabled state to an enabled state, which causes the receive FIFO buffer 28 to start receiving data from the RF transceiver 12.

Since the received RF message is sent from another device, such as a base station, the timing relationship between the other device and the RF communications system 10 may be indeterminate. Therefore, an estimated receive slot delay $T_{RXSLOT}$ is the time between when the receive data enable signal $EN_{RXP}$ transitions to an enabled state and a receive slot boundary $SB_{RX}$ in the received baseband message is detected, as estimated by the baseband processing circuitry 14 after analyzing the received RF message. Since the received RF message may be clocked into the receive FIFO buffer 28, there may be some timing error due to sampling in determining the exact estimated receive slot delay $T_{RXSLOT}$. The delay between a receive slot boundary $SB_{RX}$ in the RF receive antenna signal $RF_{ANTRX}$ and the same slot boundary in the receive baseband signal $BB_{RX}$ is a receive propagation delay $T_{RXPD}$.

Figure 8:
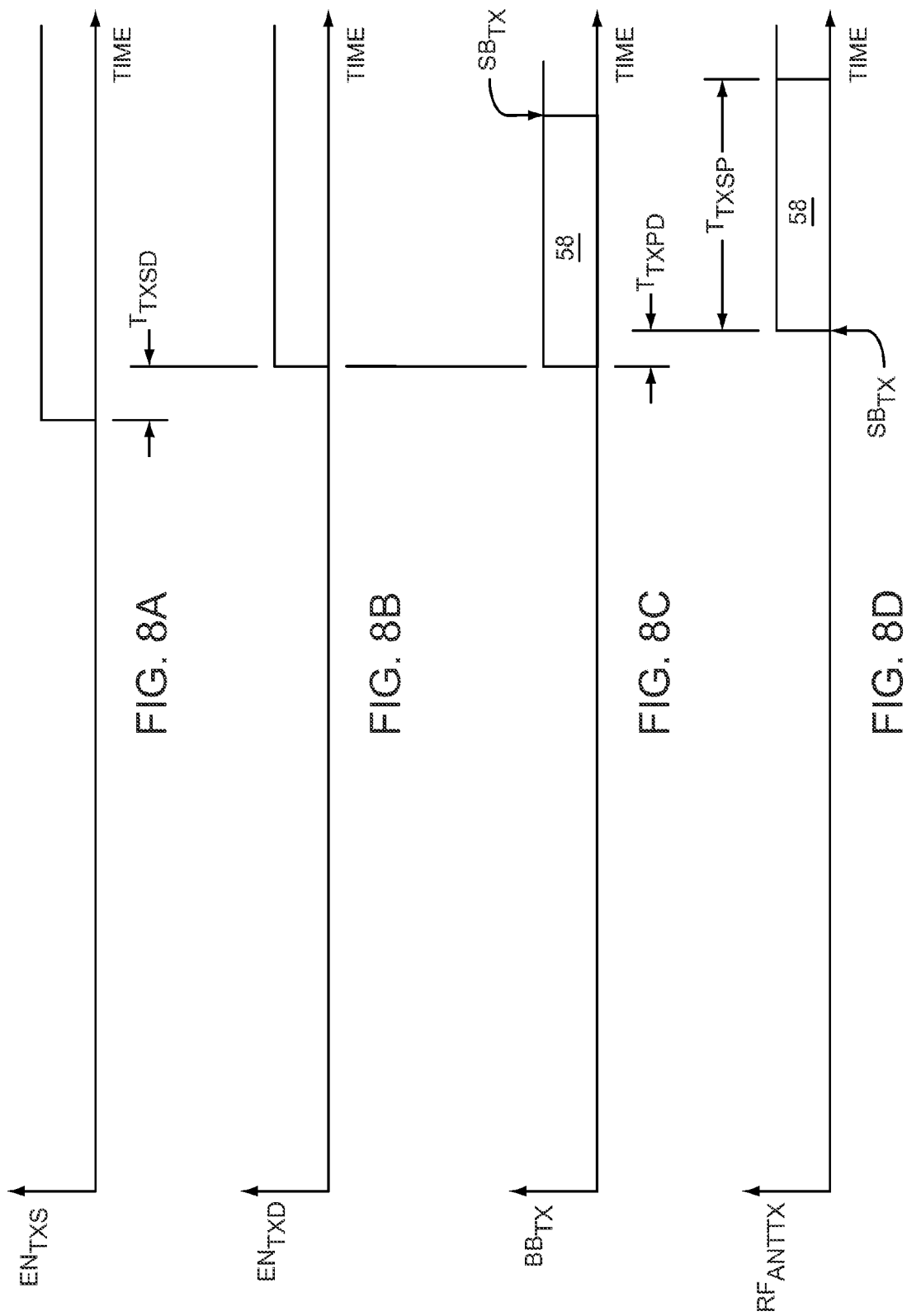

FIGS. 8A, 8B, 8C, and 8D are graphs illustrating timing relationships between a transmitted RF message and different transmit signals, according to one embodiment of the present invention. FIG. 8A shows the transmit start enable signal $EN_{TXS}$ transitioning from a disabled state to an enabled state. FIG. 8B shows the transmit data enable signal $EN_{TXD}$ transitioning from a disabled state to an enabled state, which causes the transmit FIFO buffer 26 to start transmitting data to the RF transceiver 12. FIG. 8C shows a transmitted baseband message in the transmit baseband signal $BB_{TX}$ as it is sent from the transmit FIFO buffer 26 when the transmit data enable signal $EN_{TXD}$ transitions from the disabled state to the enabled state. FIG. 8D is similar to FIG. 6B, and shows the transmitted RF message, which mirrors the transmitted baseband message, in an RF transmit antenna signal $RF_{ANTTX}$.

A transmit start delay $T_{TXSD}$ is the time between when the transmit start enable signal $EN_{TXS}$ transitions from a disabled state to an enabled state and when the transmit data enable signal $EN_{TXD}$ transitions from a disabled state to an enabled state. The delay between the first transmit slot boundary $SB_{TX}$ in the transmit baseband signal $BB_{TX}$ and the same slot boundary in the RF transmit antenna signal $RF_{ANTTX}$ is a transmit propagation delay $T_{TXPD}$.

Since receive and transmit TAS messages between the synchronization circuitry 16 and the baseband processing circuitry 14 may introduce timing latency variations, the baseband processing circuitry 14 cannot determine exactly when the combined counter 34 reaches the receive count value $VAL_{RXFIRE}$ or the transmit count value $VAL_{TXFIRE}$. However, as long as a combined counter period $T_{CCP}$ of the combined counter 34, which will be discussed in later detail below, is long enough such that the baseband processing circuitry 14 can update the receive count value $VAL_{RXFIRE}$, the transmit count value $VAL_{TXFIRE}$, the transmit fire enable signal $EN_{TXFIRE}$, and the receive fire enable signal $EN_{RXFIRE}$, with adequate set-up and hold times relative to the combined counter 34 reaching the receive count value $VAL_{RXFIRE}$ or the transmit count value $VAL_{TXFIRE}$ events, then the baseband processing circuitry 14 can successfully manage the synchronization of the transmitted RF message with the received RF message to meet system requirements.

FIGS. 9A, 9B, and 9C are similar to FIGS. 6A, 7B, and 6B, respectively, and illustrate a detailed timing budget between a received RF message and a transmitted RF message, according to one embodiment of the present invention. The baseband processing circuitry 14 must determine a desired receive to transmit delay $T_{RX\_TX\_TOTAL}$, which may be equal to a whole number times the receive slot duration $T_{RXSP}$. An uncontrollable delay $T_{DD}$ is defined as the receive propagation delay $T_{RXPD}$ plus the transmit start delay $T_{TXSD}$ plus the transmit propagation delay $T_{TXPD}$ minus the estimated receive slot delay $T_{RXSLOT}$, which may be represented by EQ. 1.

$$T_{UD}=T_{RXPD}+T_{TXSD}+T_{TXPD}-T_{RXSLOT}. \qquad \text{EQ. 1}$$

If N is a whole number, M is a whole number, a multiple counter period $T_{MCP}$ is equal to M times the combined counter period $T_{CCP}$, a combined counter delta value $T_{CDV}$ is equal to the time delay between when the combined counter 34 reaches the receive count value $VAL_{RXFIRE}$ and when the combined counter 34 reaches the transmit count value $VAL_{TXFIRE}$, then a controllable delay $T_{CD}$ is defined as N times the receive slot duration $T_{RXSP}$ plus the multiple counter period $T_{MCP}$ plus the combined counter delta value $T_{CDV}$, which may be represented by EQ. 2.

$$T_{CD}=(N*T_{RXPD})+T_{MCP}+T_{CDV}. \qquad \text{EQ. 2}$$

Therefore, the receive to transmit delay $T_{RX\_TX\_TOTAL}$ is equal to the uncontrollable delay $T_{DD}$ plus the controllable delay $T_{CD}$, which may be represented by EQ. 3.

$$T_{RX\_TX\_TOTAL}=T_{UD}+T_{CD}. \qquad \text{EQ. 3}$$

By selecting the appropriate values of N, M, and the combined counter delta value $T_{CDV}$, the desired receive to transmit delay $T_{RX\_TX\_TOTAL}$ can be provided. The baseband processing circuitry 14 controls the combined counter delta value $T_{CDV}$ by proper selection of the receive count value $VAL_{RXFIRE}$ and the transmit count value $VAL_{TXFIRE}$. The baseband processing circuitry 14 controls N and M by proper selection of the time between when the receive fire enable signal $EN_{RXFIRE}$ transitions from a disabled state to an enabled state and when the transmit fire enable signal $EN_{TXFIRE}$ transitions from a disabled state to an enabled state.

FIG. 10 shows details of the counter circuitry 32 illustrated in FIG. 3, according to an additional embodiment of the present invention. The first and second transmit start counters 40, 42 and the transmit start flip-flop 44 illustrated in FIG. 4 are eliminated. The data output Q of the transmit flip-flop 36 provides the transmit data enable signal $EN_{TXD}$.

FIGS. 11A and 11B are graphs showing behaviors of the combined counter 34 illustrated in FIG. 4. FIG. 11A illustrates a climbing combined counter value as time progresses until a maximum combined counter value $VAL_{CCM}$ is reached. Then, the combined counter 34 repeatedly rolls over to begin another counter cycle and the combined counter value drops to zero. The relationships between the receive count value $VAL_{RXFIRE}$, the transmit count value $VAL_{TXFIRE}$, and the combined counter delta value $T_{CDV}$ are illustrated. The combined counter period $T_{CCP}$ is shown. FIG. 11B is similar to 11A and shows the multiple counter period $T_{MCP}$ as a whole number multiple of the combined counter period $T_{CCP}$.

FIGS. 12A, 12B, 12C, and 12D are graphs illustrating timing relationships between the behavior of the combined counter 34 and different receive signals, according to one embodiment of the present invention. FIG. 12A illustrates a climbing combined counter value similar to FIG. 11A. FIG. 12B shows the receive fire enable signal $EN_{RXFIRE}$ transitioning from a disabled state to an enabled state with receive fire set-up and hold times $T_{RXFSU}$, $T_{RXFHO}$ relative to when the combined counter 34 reaches the receive count value $VAL_{RXFIRE}$. FIGS. 12C and 12D show the receive fire signal $FIRE_{RX}$ and the receive data enable signal $EN_{RXD}$, respectively, transitioning from a disabled state to an enabled state when the combined counter 34 reaches the receive count value $VAL_{RXFIRE}$.

FIGS. 13A, 13B, 13C, and 13D are graphs illustrating timing relationships between the behavior of the combined counter 34 and different transmit signals, according to one embodiment of the present invention. FIG. 13A illustrates a climbing combined counter value similar to FIG. 11A. FIG. 13B shows the transmit fire enable signal $EN_{TXFIRE}$ transitioning from a disabled state to an enabled state with transmit fire set-up and hold times $T_{TXFSU}$, $T_{TXFHO}$ relative to when the combined counter 34 reaches the transmit count value $VAL_{TXFIRE}$. FIGS. 13C and 13D shows the transmit fire signal $FIRE_{TX}$ and the transmit start enable signal $EN_{TXS}$, respectively, transitioning from a disabled state to an enabled state when the combined counter 34 reaches the transmit count value $VAL_{TXFIRE}$.

FIGS. 14A, 14B, and 14C are graphs illustrating timing relationships between the behavior of the first transmit start counter 40 and different transmit signals, according to one embodiment of the present invention. FIG. 14A shows the transmit start enable signal $EN_{TXS}$ transitioning from a disabled state to an enabled state. FIG. 14B illustrates a first transmit start counter value starting at zero, which is coincident with the transmit start enable signal $EN_{TXS}$ transitioning from a disabled state to an enabled state, and then climbing as time progresses until a maximum transmit start counter value $VAL_{SCM}$ is reached. Then, the first transmit start counter 40 repeatedly rolls over to begin another counter cycle and the first transmit start counter value drops to zero. A first transmit start counter period $T_{SCP}$ is shown, and the transmit start delay $T_{TXSD}$ is shown as a multiple of the first transmit start counter period $T_{SCP}$. FIG. 14C shows the transmit data enable signal $EN_{TXD}$ transitioning from a disabled state to an enabled state. FIGS. 14A and 14C show the transmit start delay $T_{TXSD}$ as the time from when the transmit start enable signal $EN_{TXS}$ transitions to an enabled state to when the transmit data enable signal $EN_{TXD}$ transitions to an enabled state.

In an exemplary embodiment of the present invention, a system requirement may specify the receive to transmit delay $T_{RX\_TX\_TOTAL}$ to be a whole number multiple of the receive slot duration $T_{RXSP}$. A timing tolerance requirement of the receive to transmit delay $T_{RX\_TX\_TOTAL}$ may be no more than plus or minus 1.5 chip durations. The combined counter period $T_{CCP}$ may be about 16 chip durations. The first transmit start counter period $T_{SCP}$ may be equal to about 8 chip durations. The receive slot duration $T_{RXSP}$, the transmit slot duration $T_{TXSP}$, or both, may be equal to about 2560 chip durations. A value of the transmit start delay $T_{RXSP}$ divided by a value of the first transmit start counter period $T_{SCP}$ may be equal to about three.

An example of the RF communications system 10 synchronizing an asynchronous received RF message with a transmitted RF message starts with the transmit enable signal $EN_{TX}$, the receive enable signal $EN_{RX}$, the receive fire enable signal $EN_{RXFIRE}$, the transmit fire enable signal $EN_{TXFIRE}$, the transmit data enable signal $EN_{TXD}$, the transmit start enable signal $EN_{TXS}$ and the receive data enable signal $EN_{RXD}$ all in a disabled state. First, the baseband processing circuitry 14 transitions the receive enable signal $EN_{RX}$ to an enabled state. The baseband processing circuitry 14 transitions the transmit enable signal $EN_{TX}$ to an enabled state some time before using the transmitter. Additionally, transmit data must be sent from the baseband processing circuitry 14 to the transmit FIFO buffer 26 before the transmit data is to be sent to the RF transceiver 12.

The baseband processing circuitry 14 sends a receive count value $VAL_{RXFIRE}$ to the combined counter 34. The receive fire signal $FIRE_{RX}$ transitions to an active state and back to an inactive state whenever the combined counter 34 reaches the receive count value $VAL_{RXFIRE}$; however, since the receive fire enable signal $EN_{RXFIRE}$ is in a disabled state, the receive flip-flop 38 is held in reset. The baseband processing circuitry 14 transitions the receive fire enable signal $EN_{RXFIRE}$ to an enabled state. Then, when the combined counter 34 reaches the receive count value $VAL_{RXFIRE}$, the receive fire signal $FIRE_{RX}$ transitions to an active state, the receive flip-flop 38 is set, thereby driving the receive data enable signal $EN_{RXD}$ from a disabled state to an enabled state, which causes the receive FIFO buffer 28 to start receiving data from the RF transceiver 12.

The received data is forwarded from the receive FIFO buffer 28 to the baseband processing circuitry 14, which analyzes the received data and estimates the receive slot delay $T_{RXSLOT}$ based on the received data. The baseband processing circuitry 14 determines the desired receive to transmit delay $T_{RX\_TX\_TOTAL}$ and calculates the uncontrollable delay $T_{UD}$ from the receive propagation delay $T_{RXPD}$, the transmit start delay $T_{TXSD}$, the transmit propagation delay $T_{RXPD}$, and the estimated receive slot delay $T_{RXSLOT}$. Then, the baseband processing circuitry 14 determines the controllable delay $T_{CD}$ based on the desired receive to transmit delay $T_{RX\_TX\_TOTAL}$ and the uncontrollable delay $T_{UD}$. Further, the baseband processing circuitry 14 determines the number of receive slot durations $T_{RXSP}$, the multiple counter period $T_{MCP}$, and the combined counter delta value $T_{CPV}$ based on the controllable delay $T_{CD}$. Additionally, the baseband processing circuitry 14 determines the transmit count value $VAL_{TXFIRE}$ based on the receive count value $VAL_{RXFIRE}$ and the combined counter delta value $T_{CDV}$.

The baseband processing circuitry 14 sends the transmit count value $VAL_{TXFIRE}$ to the combined counter 34 with adequate transmit fire set-up and hold times $T_{TXFSU}$, $T_{TXFHO}$. The transmit fire signal $FIRE_{TX}$ transitions to an active state and back to an inactive state whenever the combined counter 34 reaches the transmit count value $VAL_{TXFIRE}$; however, since the transmit fire enable signal $EN_{TXFIRE}$ is in a disabled state, the transmit flip-flop 36 is held in reset. The baseband processing circuitry 14 transitions the transmit fire enable signal $EN_{TXFIRE}$ to an enabled state during the appropriate cycle of the combined counter 34. Then, when the combined counter 34 reaches the transmit count value $VAL_{TXFIRE}$, the transmit fire signal $FIRE_{TX}$ transitions to an active state, the transmit flip-flop 36 is set, thereby driving the transmit start enable signal $EN_{TXS}$ from a disabled state to an enabled state, which removes the first and second transmit start counters 40, 42 and the transmit start flip-flop 44 from reset.

The first transmit start counter 40 repeatedly increments until it rolls over. The second transmit start counter 42 counts the number of roll overs of the first transmit start counter 40. When the second transmit start counter 42 reaches the appropriate count, the transmit start flip-flop 44 is set, thereby driving the transmit data enable signal $EN_{TXD}$ from a disabled state to an enabled state, which causes the transmit FIFO buffer 26 to start sending transmit data to the RF transceiver 12 for transmission.

An application example of synchronization circuitry 16 is its use in a mobile terminal 60, the basic architecture of which is represented in FIG. 15. The mobile terminal 60 may include a receiver front end 62, an RF transmitter section 64, the antenna 18, a duplexer or switch 66, a baseband processor 68, a control system 70, a frequency synthesizer 72, the synchronization circuitry 16, and an interface 74. The receiver front end 62 receives information bearing RF signals from one or more remote transmitters provided by a base station (not shown). A low noise amplifier (LNA) 76 amplifies the signal. A filter circuit 78 minimizes broadband interference in the received signal, while down conversion and digitization circuitry 80 down converts the filtered, received signal to an intermediate or baseband frequency signal, which is then digitized into one or more digital streams. The receiver front end 62 typically uses one or more mixing frequencies generated by the frequency synthesizer 72. The synchronization circuitry 16 synchronizes with and forwards the digitized received signal to the baseband processor 68 to extract the information or data bits conveyed in the received signal. This processing typically comprises demodulation, decoding, and error correction operations. As such, the baseband processor 68 is generally implemented in one or more digital signal processors (DSPs).

On the transmit side, the baseband processor 68 receives digitized data, which may represent voice, data, or control information, from the control system 70, which it encodes for transmission. The encoded data is output to the synchronization circuitry 16, which synchronizes the encoded data with the synchronized digitized received signal. The synchronized encoded data is forwarded to the transmitter 64, where it is used by a modulator 82 to modulate a carrier signal that is at a desired transmit frequency. Power amplifier circuitry 84 amplifies the modulated carrier signal to a level appropriate for transmission, and delivers the amplified and modulated carrier signal to the antenna 18 through the duplexer or switch 66.

A user may interact with the mobile terminal 60 via the interface 74, which may include interface circuitry 86 associated with a microphone 88, a speaker 90, a keypad 92, and a display 94. The interface circuitry 86 typically includes analog-to-digital converters, digital-to-analog converters, amplifiers, and the like. Additionally, it may include a voice encoder/decoder, in which case it may communicate directly with the baseband processor 68. The microphone 88 will typically convert audio input, such as the user's voice, into an electrical signal, which is then digitized and passed directly or indirectly to the baseband processor 68. Audio information encoded in the received signal is recovered by the baseband processor 68, and converted by the interface circuitry 86 into an analog signal suitable for driving the speaker 90. The keypad 92 and display 94 enable the user to interact with the mobile terminal 60, input numbers to be dialed, address book information, or the like, as well as monitor call progress information.

Alternate embodiments of the present invention may include different circuit topologies of the RF communications system 10, the synchronization circuitry 16, the baseband processing circuitry 14, the counter circuitry 32, or any combination thereof. Those skilled in the art will recognize improvements and modifications to the preferred embodiments of the present invention. All such improvements and modifications are considered within the scope of the concepts disclosed herein and the claims that follow.

What is claimed is:
1. A method comprising:
receiving an asynchronous radio frequency (RF) message;
providing the received asynchronous RF message to synchronization circuitry,
wherein the synchronization circuitry synchronizes the received asynchronous RF message using a receive count value to provide a synchronized received asynchronous RF message;
estimating a receive time of a receive slot boundary in the synchronized received asynchronous RF message;
forming an RF transmit message;

synchronizing the RF transmit message with the receive time using a transmit count value to provide a synchronized RF transmit message; and transmitting the synchronized RF transmit message, wherein a time delay between occurrence of the receive count value and the transmit count value provides accurate timing for the start of the transmitting the synchronized RF transmit message.

2. The method of claim 1 wherein the RF transmit message comprises an asynchronous RF transmit message.

3. The method of claim 1 wherein the RF transmit message comprises a transmit slot boundary.

4. The method of claim 3 wherein:
the received asynchronous RF message comprises a receive slot having a receive slot duration; and
a delay from the receive slot boundary to the transmit slot boundary is about equal to a whole number times the receive slot duration.

5. The method of claim 3 wherein a delay from the receive slot boundary to the transmit slot boundary includes a transmit start delay.

6. The method of claim 3 wherein a delay from the receive slot boundary to the transmit slot boundary includes at least one of a transmit propagation delay and a receive propagation delay.

7. The method of claim 3 wherein a delay from the receive slot boundary to the transmit slot boundary is adjusted to provide proper timing for the start of the transmitting the synchronized RF transmit message.

8. The method of claim 1 wherein the estimating the receive time step further comprises estimating the receive time using baseband processing circuitry.

9. A radio frequency (RF) communications system comprising:
an RF transceiver adapted to:
receive an RF signal having an asynchronous receive RF message;
provide the asynchronous receive RF message to synchronization circuitry;
receive a synchronized transmit RF message; and
transmit an RF signal having the synchronized transmit RF message; and
the synchronization circuitry adapted to:
receive the asynchronous receive RF message;
synchronize the asynchronous receive RF message to create a synchronized receive RF message using a receive count value;
obtain an estimated receive time of a receive slot boundary in the synchronized receive RF message;
obtain a transmit RF message;
synchronize the transmit RF message with the estimated receive time using a transmit count value to create the synchronized transmit RF message; and
provide the synchronized transmit RF message,
wherein a time delay between occurrence of the receive count value and the transmit count value provides accurate timing for transmission of the synchronized transmit RF message.

10. The RF communications system of claim 9 further comprising baseband processing circuitry adapted to:
receive the synchronized receive RF message;
analyze the synchronized receive RF message to estimate and provide the estimated receive time; and
form and provide the transmit RF message.

11. The RF communications system of claim 10 wherein the baseband processing circuitry is further adapted to provide the transmit count value to a transmit counter, which uses the transmit count value to create the synchronized transmit RF message.

12. The RF communications system of claim 10 wherein the baseband processing circuitry is further adapted to provide the receive count value to a receive counter, which uses the receive count value to create the synchronized receive RF message.

13. The RF communications system of claim 10 wherein the baseband processing circuitry is further adapted to:
provide the receive count value to a combined counter, which uses the receive count value to create the synchronized receive RF message; and
provide the transmit count value to the combined counter, which uses the transmit count value to create the synchronized transmit RF message.

14. The RF communications system of claim 10 wherein an RF integrated circuit comprises the RF transceiver and the synchronization circuitry, and a baseband integrated circuit comprises the baseband processing circuitry.

15. The RF communications system of claim 9 wherein the synchronization circuitry comprises a combined counter, which uses the receive count value to create the synchronized receive RF message and uses the transmit count value to create the synchronized transmit RF message.

16. The RF communications system of claim 9 wherein an RF integrated circuit comprises the RF transceiver and the synchronization circuitry.

17. The RF communications system of claim 9 wherein the synchronization circuitry comprises a transmit start counter, which is used to create the synchronized transmit RF message.

18. The RF communications system of claim 9 wherein the synchronization circuitry is further adapted to:
receive a receive data enable signal; and
transfer the asynchronous receive RF message from the RF transceiver based on the receive data enable signal,
wherein the synchronized receive RF message is based on the transfer.

19. The RF communications system of claim 18 wherein the synchronization circuitry further comprises a receive first-in first-out buffer adapted to receive the asynchronous receive RF message based on the receive data enable signal.

20. The RF communications system of claim 18 further comprising baseband processing circuitry adapted to provide the receive data enable signal.

21. The RF communications system of claim 9 wherein the synchronization circuitry is further adapted to:
receive a transmit data enable signal; and
transfer the synchronized transmit RF message to the RF transceiver based on the transmit data enable signal,
wherein the synchronized transmit RF message is based on the transfer.

22. The RF communications system of claim 21 wherein the synchronization circuitry further comprises a transmit first-in first-out buffer adapted to provide the synchronized transmit RF message based on the transmit data enable signal.

23. The RF communications system of claim 21 further comprising baseband processing circuitry adapted to provide the transmit data enable signal.

24. The RF communications system of claim 9 wherein an asynchronous receive baseband message is equivalent to the asynchronous receive RF message and a synchronized transmit baseband message is equivalent to the synchronized transmit RF message.

* * * * *